Jan. 2, 1923.
T. A. RYAN.
EYEGLASSES AND SPECTACLES.
FILED APR. 14, 1920.
1,440,799
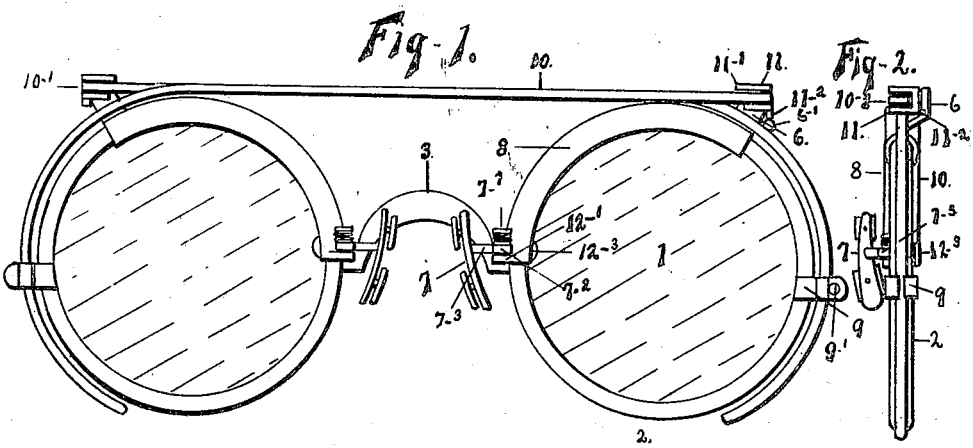
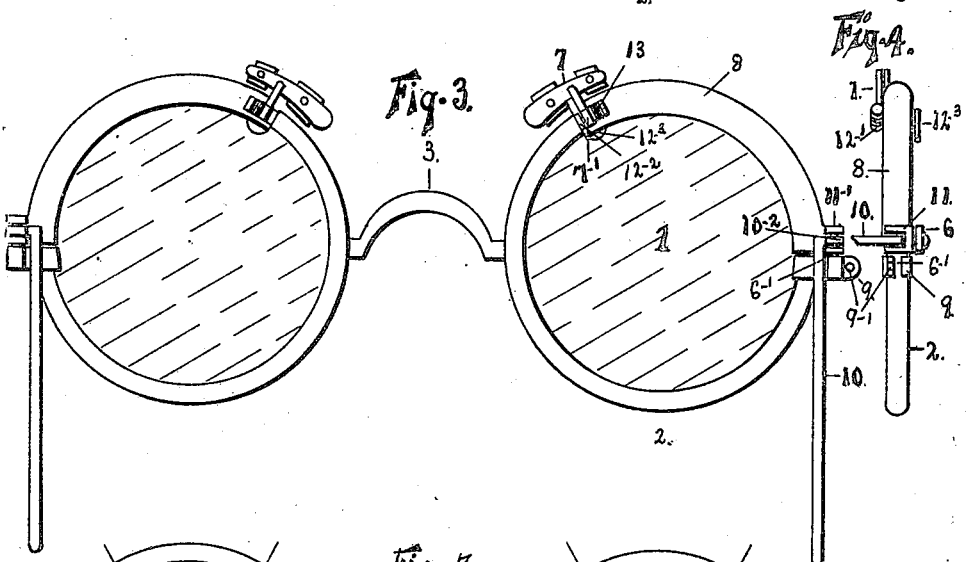
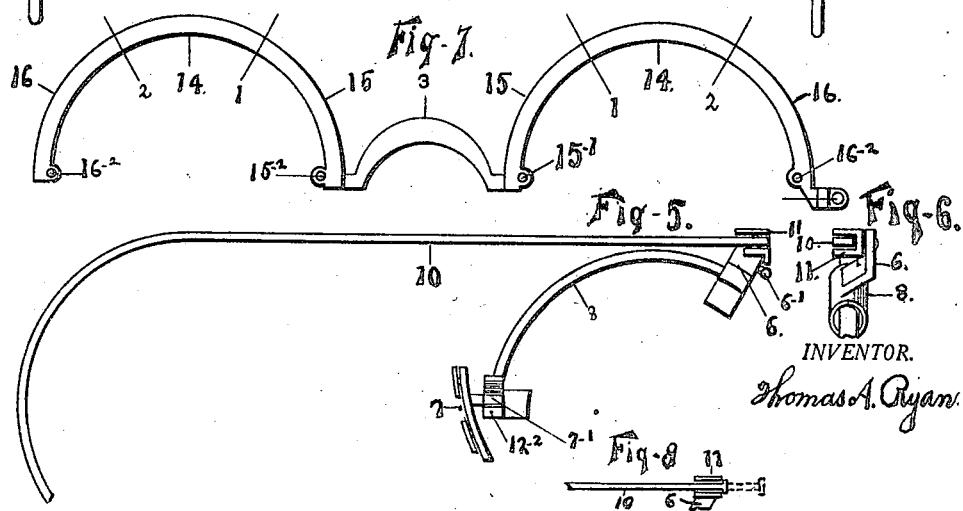
INVENTOR.
Thomas A. Ryan.

Patented Jan. 2, 1923.

1,440,799

UNITED STATES PATENT OFFICE.

THOMAS A. RYAN, OF YONKERS, NEW YORK.

EYEGLASSES AND SPECTACLES.

Application filed April 14, 1920. Serial No. 373,951.

*To all whom it may concern:*

Be it known that I, THOMAS A. RYAN, a citizen of the United States, residing in the city of Yonkers, county of Westchester, State of New York, have invented a new and useful Improvement in Eyeglasses and Spectacles, of which the following is a specification.

This invention relates to improvements in eyeglasses and spectacles, the frames, bows and clips. The main object of my invention is to provide a combination eyeglass and spectacle having but two lenses and is readily adjusted to be worn as eyeglasses or as spectacles and combining in one device all the best features of both the eyeglasses and spectacles, and added improvements.

A further object of the invention is to provide means whereby persons who use glasses may have combined in the one device eyeglasses to use for short periods, and which can be readily transformed into spectacles for reading or work as desired.

A further object of this invention is to provide means to fold closed the bows of spectacles across the top of the lenses, instead of across the center of the lenses, thus preventing the breaking the lenses and bows, and making the spectacles more compact when the bows are closed.

The useful and novel features of the invention are further disclosed in the claims, and the accompanying drawings, in which—

Fig. 1 is a view showing the device when it is formed into eyeglasses. Fig. 2 is an end view of same. Fig. 3 is a view showing the device when formed into spectacles. Fig. 4 is an end view of same. Fig. 5 is a flat view showing an ear bow attached to the end of a slidable super-frame section having attached to its other end a nose clip. Fig. 6 is an end view of same. Fig. 7 is a flat view of a semi-frame having a nose bow. Fig. 8 shows two views in cross section of the adjustable end of an ear bow. In the drawings as the parts are mostly in duplicate, the number given a part is the same in all cases.

In the drawings, number 1 is the lens, set in a frame No. 2, and connected by a nose bow No. 3. A super-frame section 8, is attached slidable on the periphery of the lens frame, and has adjustably attached at one end, the end of an ear bow 10, and has attached to its other end a nose clip 7. Projecting from the frame about opposite the nose bow and aligned with the lens is a catch 9 to hold the bows in the open and closed position.

When the bows are closed eyeglasses are formed having nose clips and means to lock in this position. The bows are closed by sliding the frame sections 8 around until the nose clips are against the nose bow 3 of the frame, the offset arm 6 of the frame section 8 is then above the upper line of the frame, permitting the ear bow 10 to clear the frame as it is closed. The hinge 11 is pivoted in the arm 6 and its turning arrested by the stops $11^1$ and $11^2$, the bows 10 engage the catches 9 locking the bows in the closed position, and the end of the catch 9 has a hole adapted to engage a clasp.

Spectacles are formed when the bows are opened and the frame section 8 slid around until the end $6^1$ engages the catches 9 locking the bow 10 in the open position, and nose clip holder 7 withdrawn from the nose bow 3. The angle at which the nose clip 12 stands in relation to the lens frame is adjusted by bending the nose clip operating arm $12^3$ which rests against the frame. The ears $7^1$ and $7^2$ are pivoted to the ears $12^1$ and $12^2$, and the spiral spring 13 around the ear pivot gives the nose clip 7 its grip. The S-shape part of the clip arm $7^3$ affords adjusting means when fitting the nose clip 7.

In Figs. 5 and 6 the ear bow 10 and the nose clip 7 and the frame section 8 are shown in flat and end views showing adjustable means to be slidably attached to a lens frame, thus affording means to convert any eyeglasses or spectacles into a combination eyeglass and spectacle. The lens frame sections having a nose bow as shown in Figs. 7 and 8 when combined with the device shown in Figs. 5 and 6 offers additional means to convert any lenses into combination eyeglasses and spectacles. This frame has its periphery formed to slidably engage upper frame section 8, and its inner side concaved to fit a lens, made in semisections or having the section 14 between 1 and 2 cut away leaving the sections 15 and 16, lens holes $15^1$ and $16^1$, nose bow 3, catches 9 and clasp holes $16^3$. In Fig. 9 the end of an ear bow 10 being adjustable is shown. There are several ways to form the slidable frame section 8 connecting the nose clip 12 and the end of the ear bow 10, one way shown is to have this section 8 slidably encase the frame.

Having thus described my invention, what I claim as new and useful is—

1. In eyeglasses or spectacles, the combination with lenses, of combined nose clips and ear bows adapted to convert said lenses into spectacles or eyeglasses.

2. In eyeglasses or spectacles, the combination with lenses of ear bows, said ear bows having means to fold across clear of said lenses, the bow part following the contour of the lenses.

3. In eyeglasses or spectacles, the combination with lenses, of lens frames connected with a nose bow, having superframe sections slidable on the periphery of said frames, said frame sections having pivoted to an offset at one end of said frame sections a hinge in which is adjustably secured the end of an ear bow, and having attached to the other end of said frame sections an adjustable spring actuated nose clip, said nose clips having secured to the grip face movable yielding plates, means to slide said frame section withdrawing said nose clips from the nose bow, and means to lock said frame sections to the lens frames when the bows are open forming spectacles, and having means to fold said ear bows clear of said lens frames the bows following the outer contour of the lens frames, and setting the nose clips at the nose bow, means to lock the bows and nose clips in said position forming eyeglasses.

4. In eyeglasses or spectacles, the combination with lenses set in a frame, of a superframe section carrying an ear bow and a nose clip, means to attach slidably said frame section to a lens frame, means to fold said ear bow in alignment with and clear of the lens frames, means to lock the ear bow in said folded position, means to combine the nose bow with the nose clips when the ear bows are folded forming eyeglasses, and means to move the nose clips from the nose bow when the ear bows are opened forming spectacles.

5. In eyeglasses or spectacles, the combination with lenses, of a super-frame section, attached slidably to frame sections connected by a nose bow and adapted to hold lenses and having a bow catch and clasp hole, said super-frame section having attached to one end an ear bow, and a nose clip actuated by a spring and bearing plates attached to the other end of said super-frame, means to lock said ear bows to the lens frame sections, and means whereby the said nose clips, springs and bearing plates are set to operate with the nose bow when the ear bows are folded, forming eyeglasses, and means to remove said nose clips from said nose bow when the ear bows are opened forming spectacles.

6. In eyeglasses, the combination with frames, said frames connected with a nose bow and adapted to hold lenses, said frames having movably attached spring actuated nose clips, said nose clips having attached movable bearing plates, having movably attached to said frames ear bows, means to fold and lock said ear bows to said frame, and means whereby said lenses are unobstructed when the bows are folded.

7. In spectacles, the combination with frames, said frames connected by a nose bow and adapted to hold lenses, said frames having movably attached spring actuated nose clips, said nose clips having attached movable bearing plates, having movably attached to said frames ear bows, means to fold said ear bows, means to lock said ear bows to the frame folded or opened, and means whereby the lenses are unobstructed when the bows are folded.

8. In eyeglasses, the combination with frames, said frames connected with a nose bow and adapted to hold lenses, said frames having movably attached spring actuated nose clips, said nose clips having movably attached bearing plates, having movably attached to said frames ear bows, means to fold said ear bows, means to lock said ear bows to said frame when the ear bows are opened or closed, and means whereby, the lenses are unobstructed when the ear bows are folded.

9. In spectacles, the combination with frame sections, said frame sections connected with a nose bow and adapted to hold lenses, having movably attached to said frame sections spring actuated nose clips, said nose clips having attached movable bearing plates, having movably attached to said frame sections ear bows, means to fold said ear bows, means to lock said ear bows to the frame sections when in a folded or open position, and means whereby said lenses are unobstructed when the said ear bows are folded.

10. In eyeglasses, the combination with frame sections, said frame sections connected with a nose bow and adapted to hold lenses, said frame sections having movably attached spring actuated nose clips, said nose clips having attached movable bearing plates, having movably attached to said frame sections ear bows, means to fold said ear bows, means to lock said ear bows to said frame sections when folded or open, and means whereby said lenses are unobstructed when the said ear bows are folded.

11. In spectacles, the combination with lenses connected by a nose bow, of ear bows combined with a hinged section, adapted to be slidably attached to said lenses, means to fold said ear bows above said lenses, and lock in folded or open position.

12. In spectacles, the combination with frames connected by a nose bow, and adapted to hold lenses, of ear bows adapted to be slidably attached to said frames, means to fold said ear bows above said lenses and lock in folded or open position.

13. In eyeglasses and spectacles, the combination of mountings carrying nose clips and hinged temples, said mountings adapted to be movably attached in the concaved periphery of a frame, said frame having a nose bow and adapted to carry lenses, said mountings having means adapted to set said nose clips into co-operation with said nose bow, and fold said temples above said lenses, the bows of said temples locking in the concave periphery of said frames forming eyeglasses when folded, and moving said nose clips from said nose bow and setting said temple hinges in position to form spectacles when opened.

14. In eyeglasses or spectacles, the combination with lenses of a member having a hinge, said hinge adapted to be movably attached to a temple having an ear bow, means to fold said ear bow aligned above said member, said member having spaced from said hinge an adjustable spring actuated nose clip having yielding plates on its bearing face, means by which said member may be movably attached to a lens.

15. In eyeglasses or spectacles, the combination with lenses, of a member having attached at one end a hinge, said hinge adapted to be movably attached to an ear bow, having an ear bow, means to fold said ear bow aligned with said member, said member having movably attached to its other end an adjustable spring actuated nose clip having yielding plates on its bearing face, means by which said member may be movably secured with a lens.

In testimony whereof I affix my signature in the presence of two witnesses.

THOMAS A. RYAN.

Witnesses:
 FRANK P. MACK,
 H. F. HARRIGAN.